United States Patent [19]

Sugawara

[11] Patent Number: 5,757,553
[45] Date of Patent: May 26, 1998

[54] EYEPIECE LENS OF WIDE VISUAL FIELD

[75] Inventor: Saburo Sugawara, Kanagawa-ken, Japan

[73] Assignee: Canon Kabushiki Kaisha, Tokyo, Japan

[21] Appl. No.: 795,728

[22] Filed: Feb. 4, 1997

Related U.S. Application Data

[62] Division of Ser. No. 273,121, Jul. 14, 1994.

[30] Foreign Application Priority Data

| Jul. 19, 1993 | [JP] | Japan | 5-178145 |
| Jul. 30, 1993 | [JP] | Japan | 5-208368 |
| Jun. 20, 1994 | [JP] | Japan | 6-160671 |

[51] Int. Cl.$^6$ .................................................. G02B 25/00
[52] U.S. Cl. .................. 359/643; 359/758; 359/761; 359/764
[58] Field of Search .................. 359/754, 755, 359/758, 761, 764, 643, 644

[56] References Cited

U.S. PATENT DOCUMENTS

| 2,899,862 | 8/1959 | Baker | 359/761 |
| 4,720,183 | 1/1988 | Dilworth | 350/410 |
| 4,747,675 | 5/1988 | Nagler | 350/410 |
| 5,255,121 | 10/1993 | Suzuki | 359/643 |

FOREIGN PATENT DOCUMENTS

| 49-115558 | 11/1974 | Japan. |
| 60-159719 | 8/1985 | Japan. |
| 63-7363 | 2/1988 | Japan. |
| 63-10409 | 3/1988 | Japan. |
| 5-119273 | 5/1993 | Japan. |
| 6-148534 | 5/1994 | Japan. |
| 1485-184-A | 6/1989 | U.S.S.R. | 359/764 |

*Primary Examiner*—David C. Nelms
*Assistant Examiner*—Dawn-Marie Bey
*Attorney, Agent, or Firm*—Fitzpatrick, Cella, Harper & Scinto

[57] ABSTRACT

Eyepiece lenses of wide visual field, one of which has a field angle of 75° or wider, and another one of which has a field angle of 60° with a smaller number of constituent lenses than the former has. One of these eyepiece lenses comprises, in the order from the light incidence side, a first lens unit of negative refractive power, a second lens unit of positive refractive power in the meniscus form concave toward the light incidence side, a third lens unit of meniscus form concave toward the light incidence side, a fourth lens unit of positive refractive power, and a fifth lens unit of positive refractive power in the meniscus form convex toward the light incidence side. A middle image plane lies within the second lens unit, or in a space between the second and third lens units.

13 Claims, 11 Drawing Sheets

FIG.5A
PUPIL DIAMETER φ 3.3
C-LINE
d-LINE
F-LINE
-1.0   1.0
SPHERICAL ABERRATION
(Dptr)
FIG.5B
ω = 40°
ΔS
ΔM
-1.0   1.0
ASTIGMATISM
(Dptr)
FIG.5C
ω = 40°
-10   10
DISTORTION(%)
FIG.5D
ω = 40°
F-LINE
C-LINE
-0.2   0.2
CHROMATIC ABERRATION
(DEG)
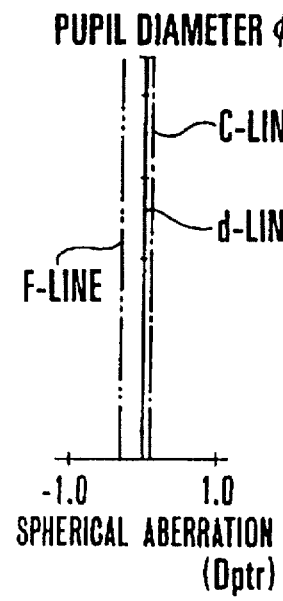
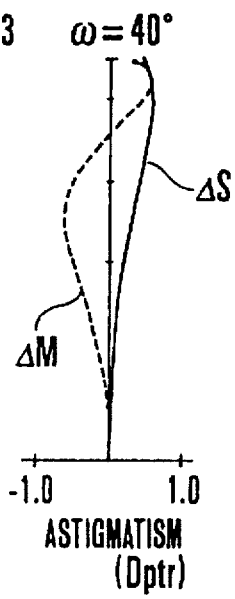
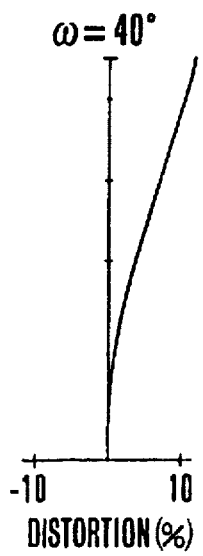
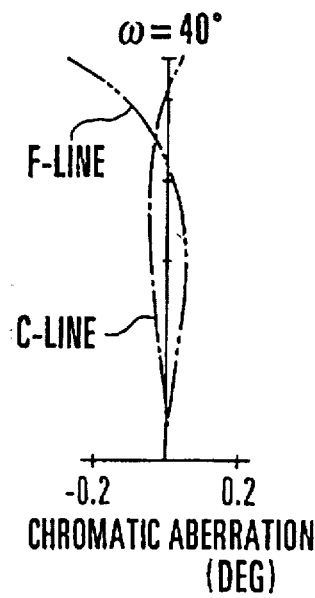
FIG.6A
PUPIL DIAMETER φ 3.3
d-LINE
F-LINE
C-LINE
-1.0   1.0
SPHERICAL ABERRATION
(Dptr)
FIG.6B
ω = 40°
ΔM
ΔS
-1.0   1.0
ASTIGMATISM
(Dptr)
FIG.6C
ω = 40°
-10   10
DISTORTION(%)
FIG.6D
ω = 40°
F-LINE
C-LINE
-0.2   0.2
CHROMATIC ABERRATION
(DEG)
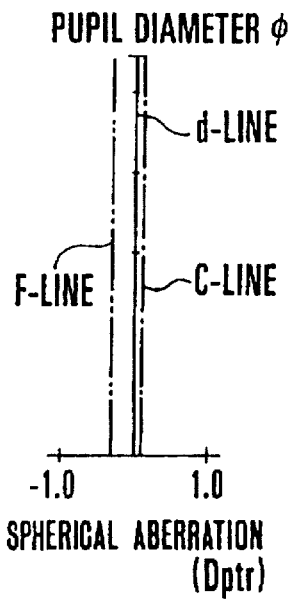
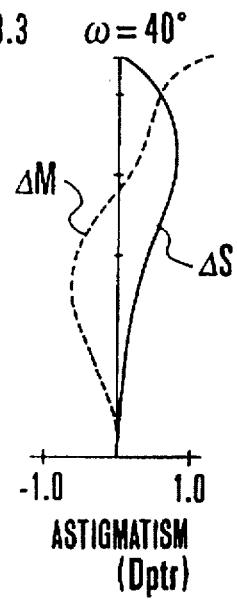
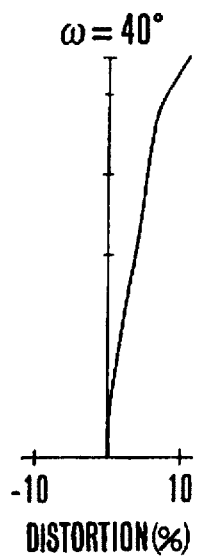
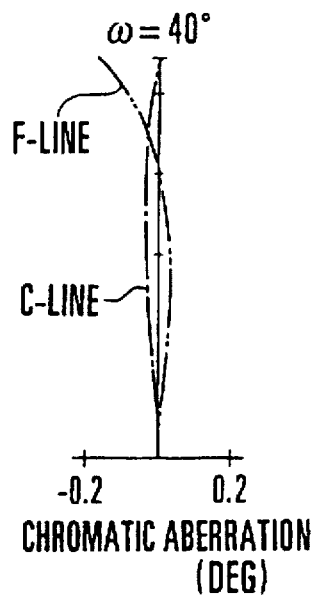

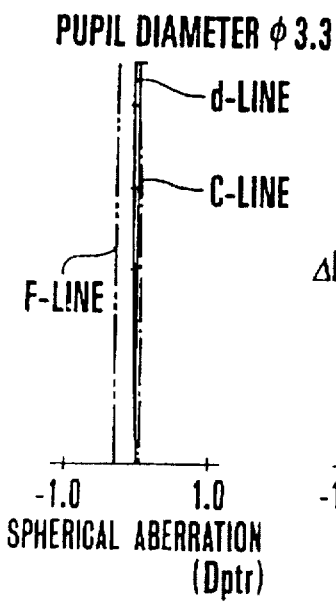
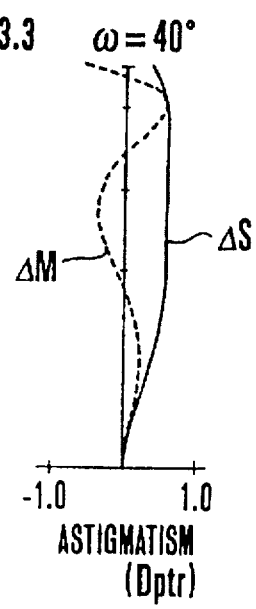
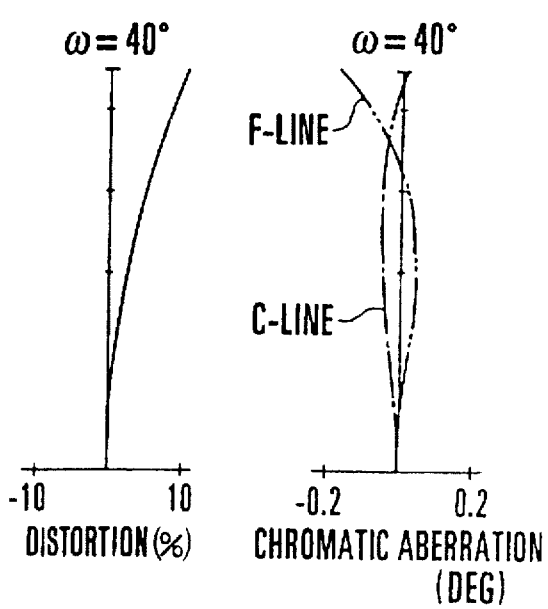
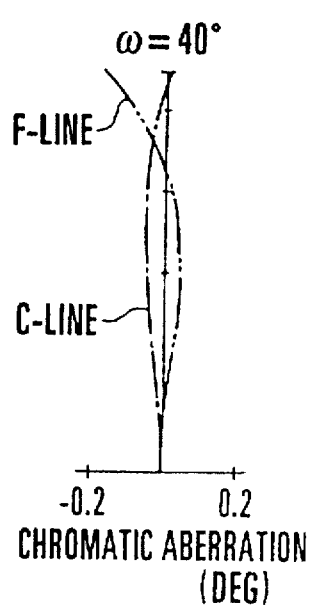
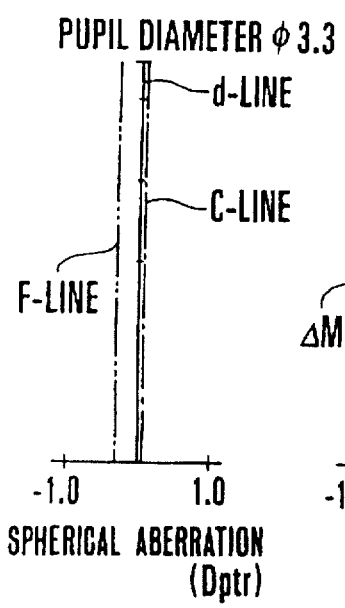
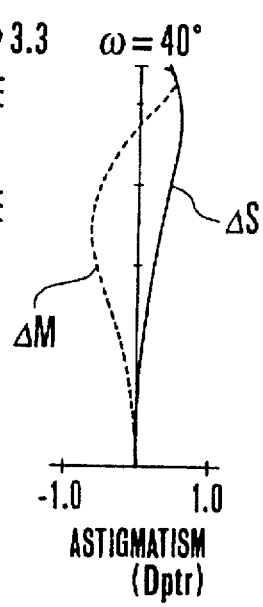
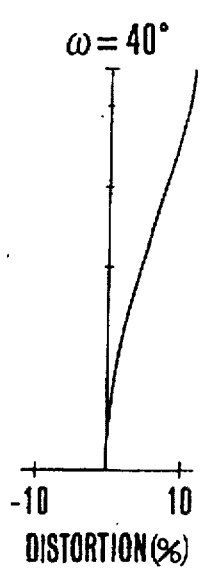
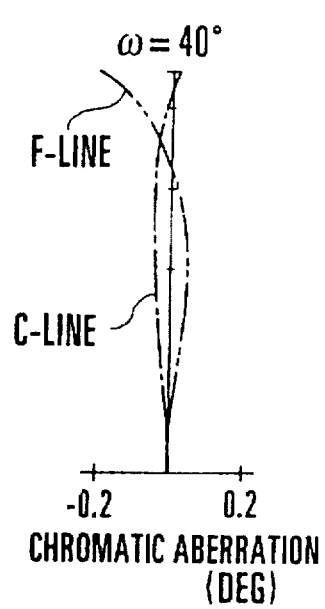

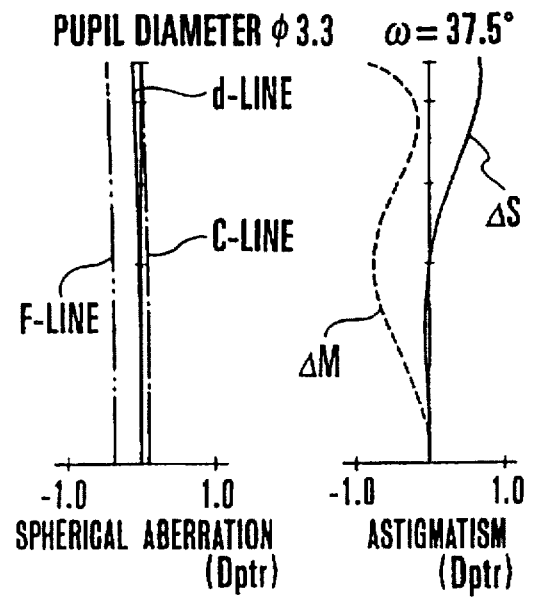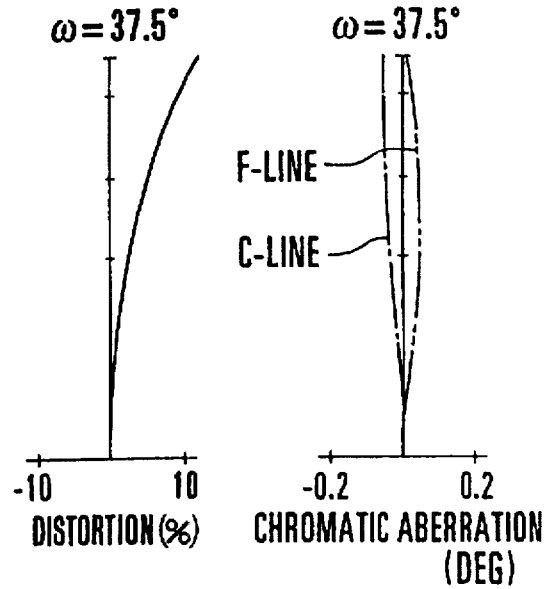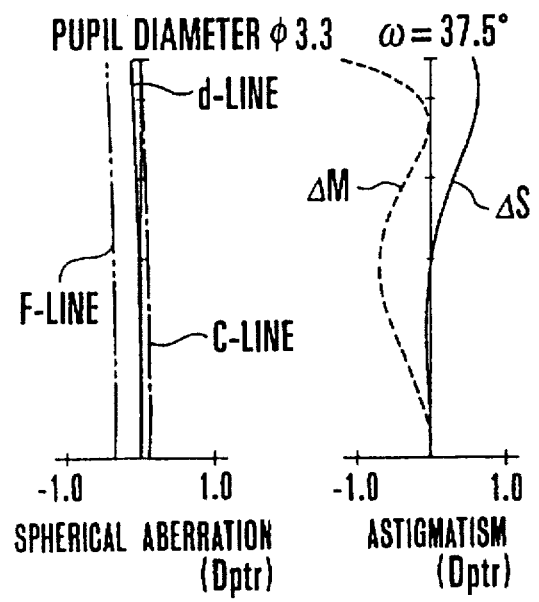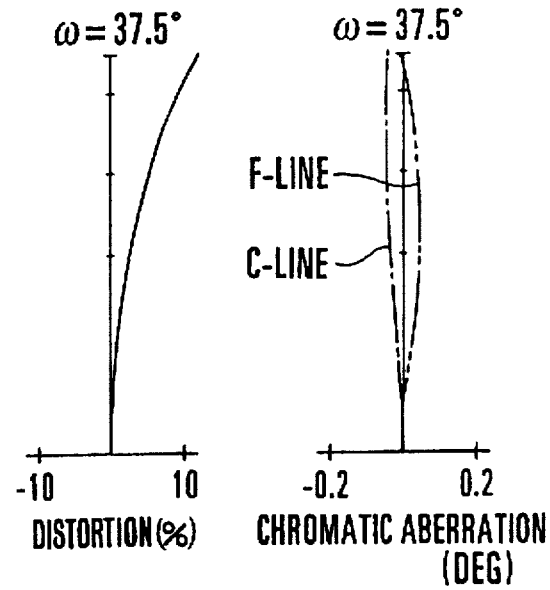

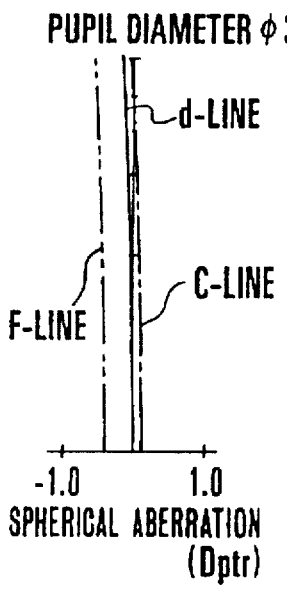
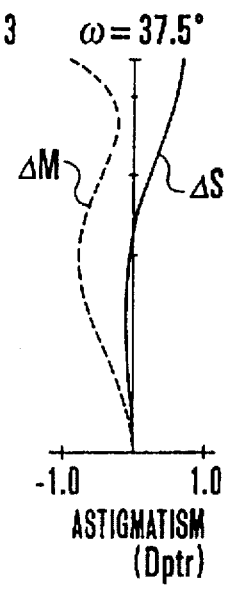
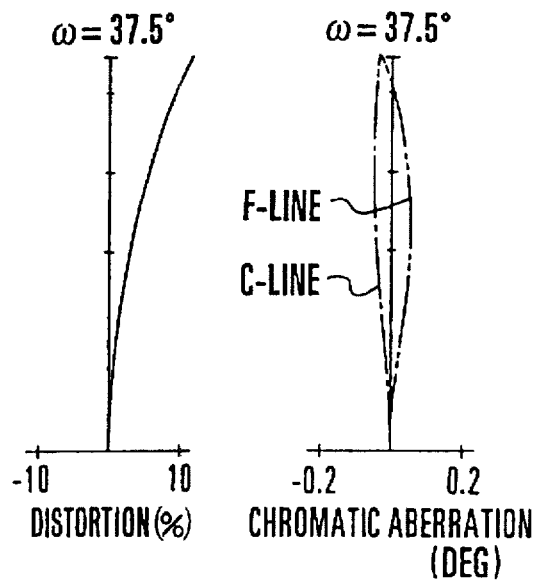
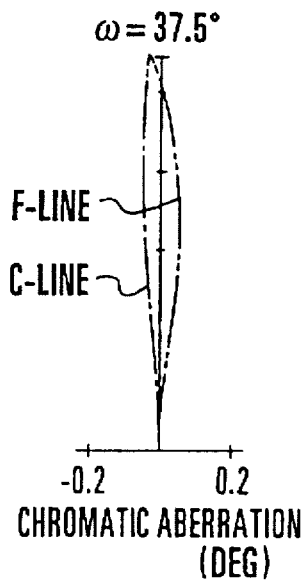
FIG.15A  FIG.15B  FIG.15C  FIG.15D
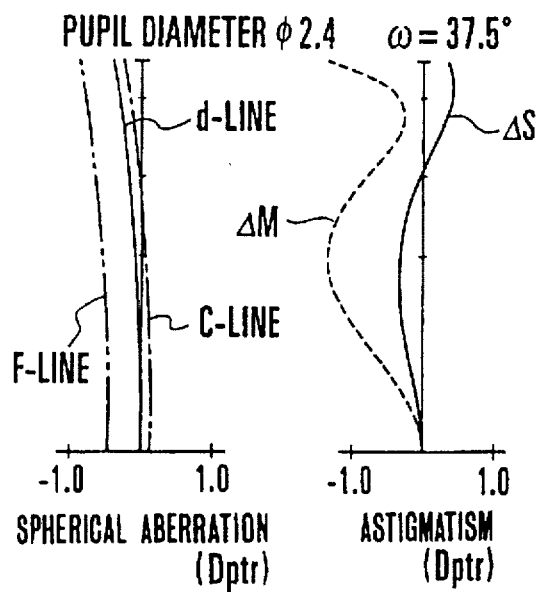
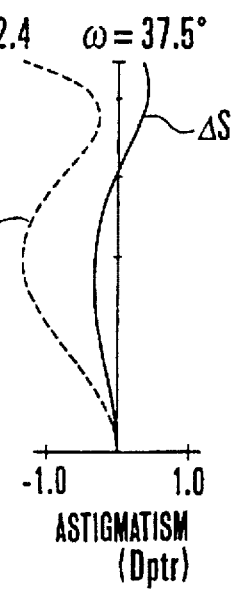
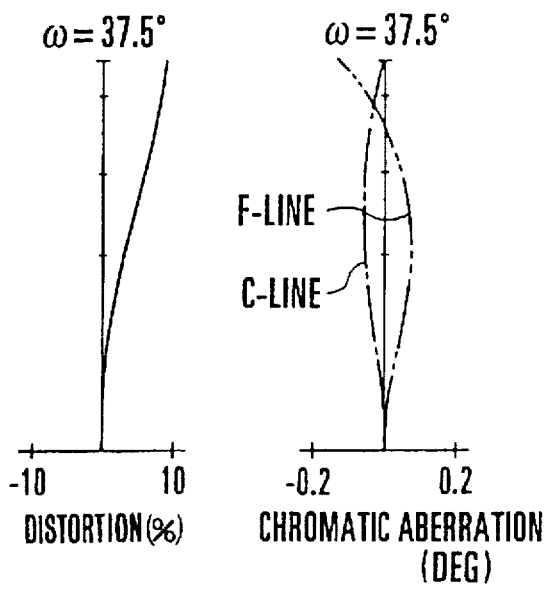
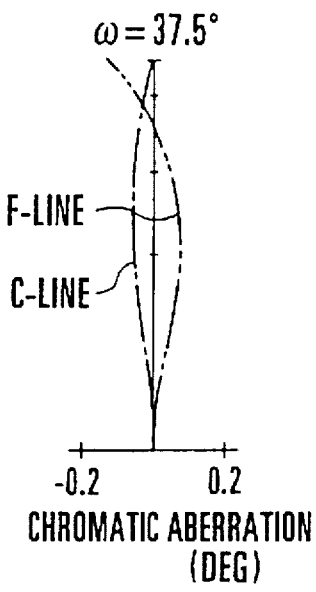
FIG.16A  FIG.16B  FIG.16C  FIG.16D PUPIL DIAMETER φ5
F-LINE
C-LINE
d-LINE -1.00    1.00
SPHERICAL ABERRATION
(Dptr)

ω = 29.5°
ΔS
ΔM

-1.00    1.00
ASTIGMATISM
(Dptr)

ω = 29.5°

-5.00    5.00
DISTORTION(%)

ω = 29.5°
F-LINE
C-LINE

-0.20    0.20
LATERAL CHROMATIC
ABERRATION (DEG)

PUPIL DIAMETER φ5
F-LINE
d-LINE
C-LINE

-1.00    1.00
SPHERICAL ABERRATION
(Dptr)

ω = 30°
ΔM
ΔS

-1.00    1.00
ASTIGMATISM
(Dptr)

ω = 30°

-5.00    5.00
DISTORTION(%)

ω = 30°
F-LINE
C-LINE

-0.20    0.20
LATERAL CHROMATIC
ABERRATION (DEG)

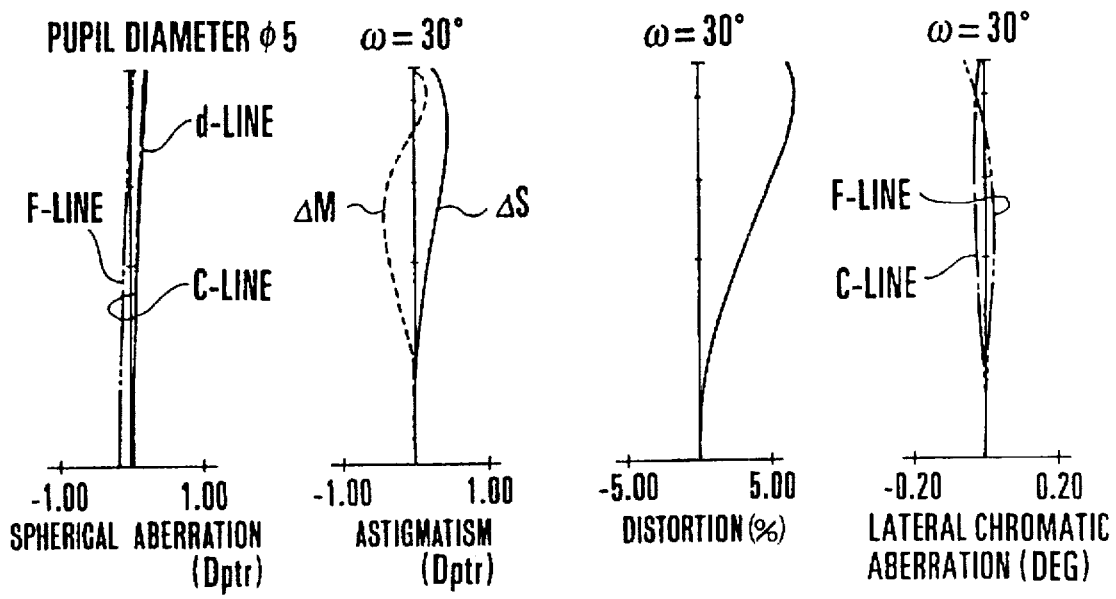

EYEPIECE LENS OF WIDE VISUAL FIELD

This application is a division of application Ser. No. 08/273,121 filed Jul. 14, 1994.

BACKGROUND OF THE INVENTION

1. Field of the Invention

This invention relates to eyepiece lenses for use in telescopes, or microscopes, and such eyepiece lenses which have a wide visual field. A description will be made about an eyepiece lens whose field angle is about 80°, and another eyepiece lens of fewer constituent elements than the former has, whose field angle is about 60°.

2. Description of the Related Art

For eyepiece lenses having apparent field angles of not less than 80°, or super wide angle eyepiece lenses, there have been known what are described in U.S. Pat. Nos. 4,720,183 and 4,747,675 and Japanese Laid-Open Patent Application No. Hei 5-119273.

However, the eyepiece lens disclosed in U.S. Pat. No. 4,720,183, though well corrected for some aberrations, is so bulky that the maximum lens diameter is 3.5 times the focal length, and so large that the physical length is 7.4 times the focal length. In application to telescopes or binoculars of small size, there is a demerit that they become too awkward to handle.

In addition, this eyepiece lens has large distortion which reaches 20% or more in the marginal zone of the visual field and its eye relief is short, being 0.63 times the focal length. Hence, it could not be said to be convenient to view.

Meanwhile, for an object on a plane to be observed, the apparent field angle may be expanded. To make the eyepiece lens suited for adaptation to such observation, it is widely known to use the Erfle type or the orthoscopic type.

For example, Japanese Laid-Open Patent Application No. Sho 49-115558 proposes an eyepiece lens of the orthoscopic type comprising two components with four elements.

In Japanese Patent Publication No. Sho 63-7363, an Erfle type eyepiece lens is proposed, comprising three components with five elements, wherein the eye relief (the distance from the back of the eyepiece lens to the observer's eye pupil) is extended.

To widen the apparent field angle to 60° or thereabout, there has been a previous proposal in Japanese Laid-Open Patent Application No. Sho 60-159719, wherein the astigmatism is lessened at the edge of the angular field. Another eyepiece lens of a wide apparent field angle of about 60° in Japanese Patent Publication No. Sho 63-10409 has relatively small distortion over the entire area of the angular field.

Returning to the precedents, the eyepiece lens of Japanese Laid-Open Patent Application No. Sho 60-159719 suffers from so large distortion as 16% at the semifield of 30°, being usable for astonomical telescopes, but tending to distort the image too greatly to be used in general-purpose binoculars.

The eyepiece lens of Japanese Patent Publication No. Sho 63-10409, though having as small distortion as 3% at the semifield of 30°, tends to produce large field curvature and astigmatism.

With the eyepiece lens of the Erfle type or the orthoscopic type, to widen the apparent field angle to 60° or more and to increase the distance from the last surface of the eyepiece lens to the observer's eye pupil (or the eye relief), while still permitting the lens form to be made compact, it is in the general case that many refracting surfaces of convergence for the off-axial principal ray are formed. Therefore, many aberrations are produced, which are very difficult to correct well for high optical performance.

SUMMARY OF THE INVENTION

An object of the invention is to provide a compact wide-angle eyepiece lens.

Another object of the invention is to provide a wide-angle eyepiece lens whose field angle is particularly widened to 75° or even more.

Still another object of the invention is to provide an eyepiece lens which, though covering a wide field of 60° in the apparent field angle, is well corrected for distortion, field curvature, lateral color and other aberrations over the entire field of view, thus obtaining an image of high quality to be observed.

These and other objects will become apparent from the following description.

BRIEF DESCRIPTION OF THE DRAWINGS

FIGS. 5A–5D show the various aberrations of the numerical example 1.

FIGS. 6A–6D show the various aberrations of the numerical example 2.

FIGS. 7A–7D show the various aberrations of the numerical example 3.

FIGS. 8A–8D show the various aberrations of the numerical example 4.

FIGS. 13A–13D show the various aberrations of the numerical example 5.

FIGS. 14A–14D show the various aberrations of the numerical example 6.

FIGS. 15A–15D show the various aberrations of the numerical example 7.

FIGS. 16A–16D show the various aberrations of the numerical example 8.

FIGS. 22A–22D show the various aberrations of the numerical example 11.

DETAILED DESCRIPTION OF THE PREFERRED EMBODIMENTS

Figure 1:
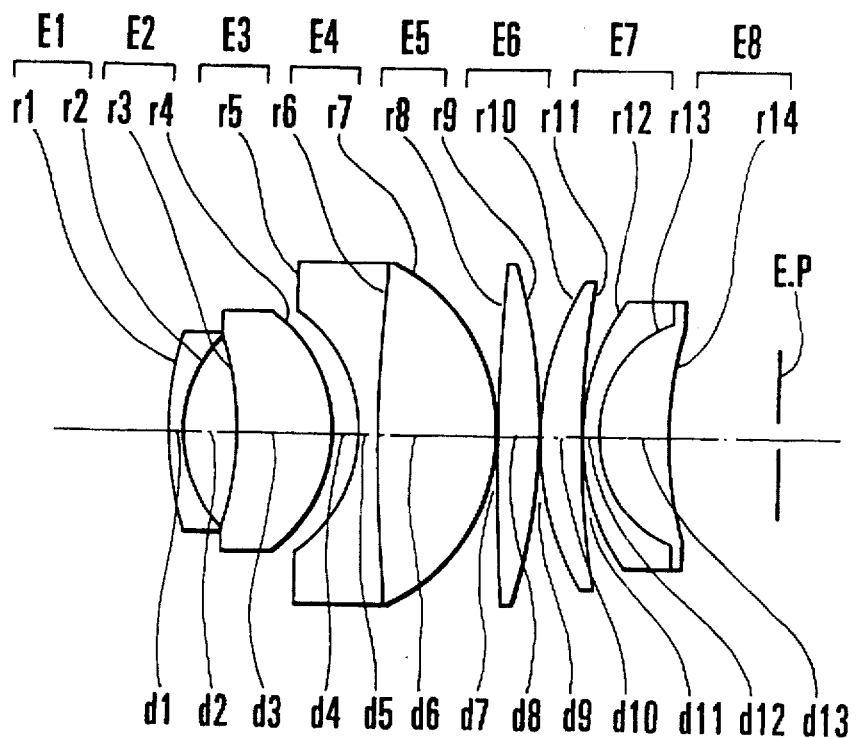
FIG. 1 is a lens block diagram of a numerical example 1.
Figure 2:
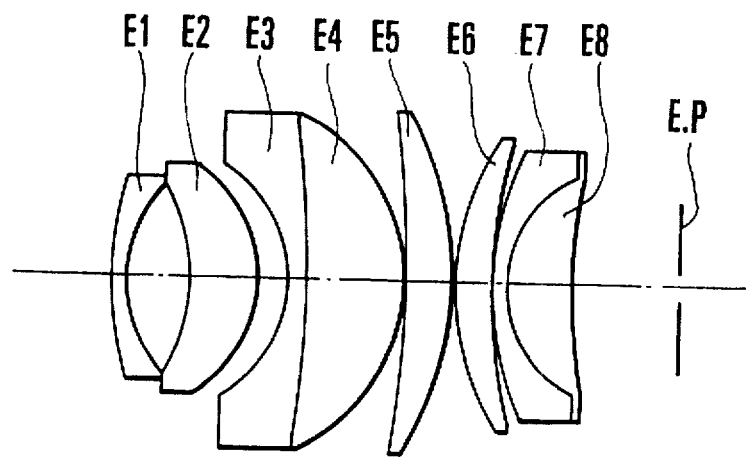
FIG. 2 is a lens block diagram of a numerical example 2.
Figure 3:
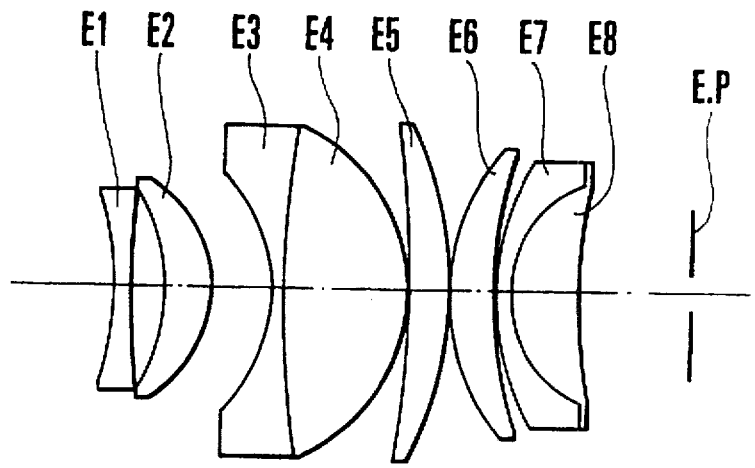
FIG. 3 is a lens block diagram of a numerical example 3.
Figure 4:
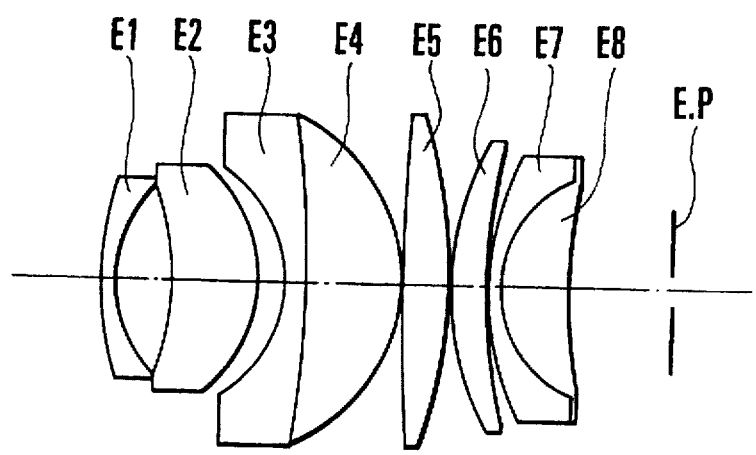
FIG. 4 is a lens block diagram of a numerical example 4.
Figure 9:
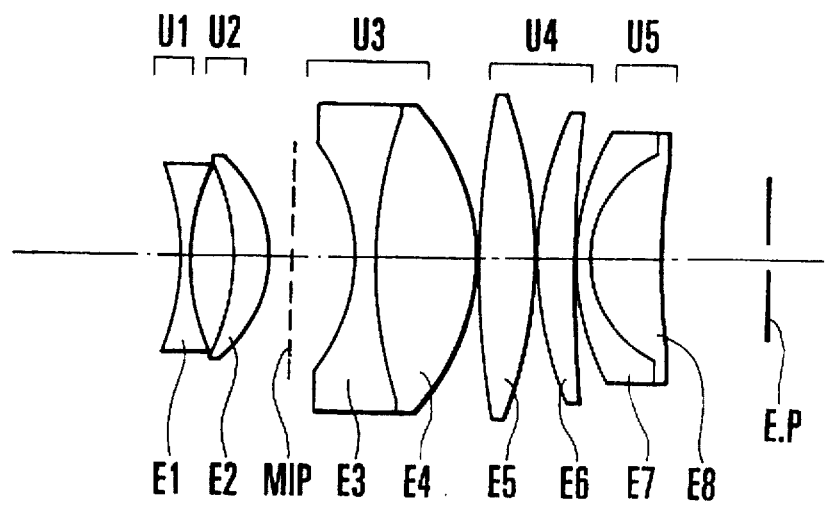
FIG. 9 is a lens block diagram of a numerical example 5.
Figure 10:
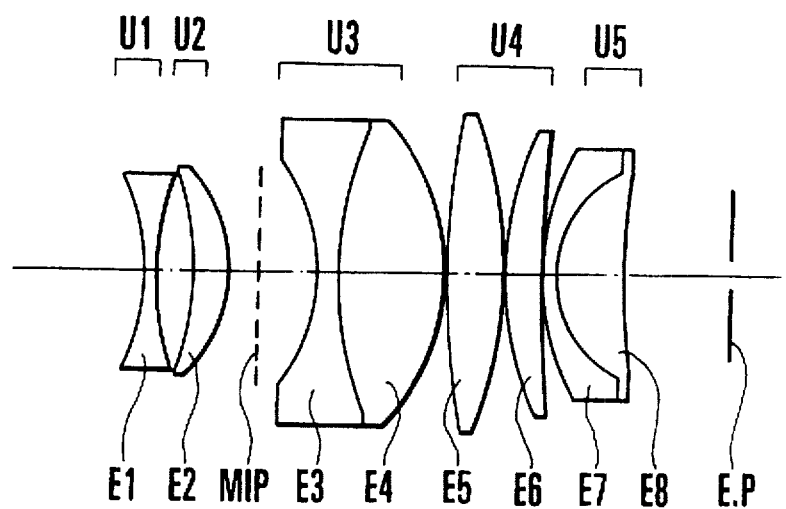
FIG. 10 is a lens block diagram of a numerical example 6.
Figure 11:
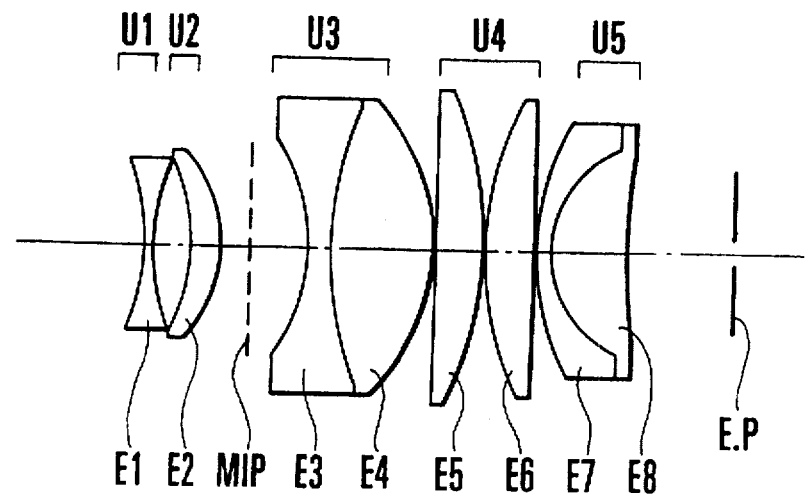
FIG. 11 is a lens block diagram of a numerical example 7.
Figure 12:
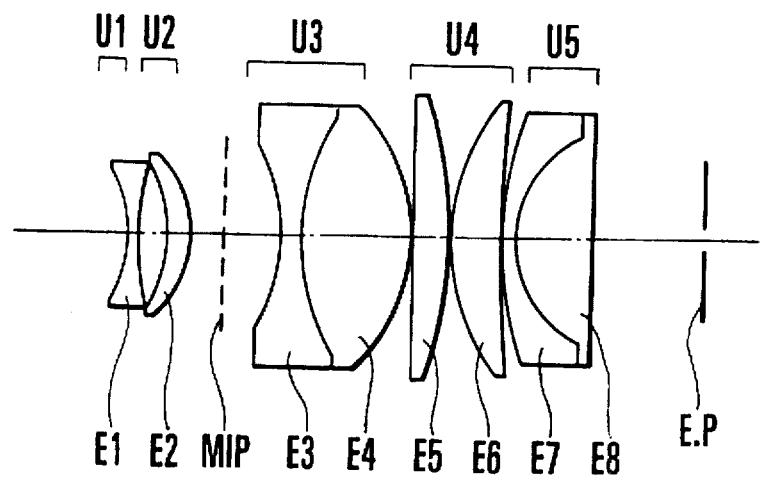
FIG. 12 is a lens block diagram of a numerical example 8.

The present invention is next described in connection with embodiments thereof by reference to the drawings.

FIG. 1 through FIG. 4 depict the longitudinal section forms of examples 1 to 4 of eyepiece lenses with their numerical data to be given later. In these drawings, the objective lens is omitted from being shown.

The eyepiece lens is constructed, comprising, in the order from the light incidence side (or the object side, or the objective lens side), a negative lens E1, a positive meniscus lens E2 concave toward the light incidence side, a cemented negative meniscus lens concave toward the light incidence side composed of a negative lens E3 of strong power to the light incidence side and a positive lens E4 of strong power to the light exit side (toward the viewer side), a positive lens E5, a positive lens E6 of strong power to the light incidence side, and a cemented positive meniscus lens convex toward the light incidence side composed of a negative meniscus lens E7 convex toward the light incidence side and a positive meniscus lens E8 convex toward the light incidence side. Its apparent field angle approaches 80° or even more. Nonetheless, the size is minimized and all aberrations are correct well. Furthermore, the eye relief is so long as 0.9 times the focal length. Notice that the term "strong" power is used in a sense of comparison with the opposite surface. The middle image is formed within the positive meniscus lens E2. E.P stands for the eye point of the viewer.

Further, it is desirable to satisfy the following conditions:

$$0.3 < r_4/r_5 < 1.5 \tag{1}$$

$$0.15 < d_4/f < 0.9 \tag{2}$$

where $r_i$: the radius of curvature of the i-th lens surface, when counted from the light incidence side;

$d_i$: the i-th axial separation between lens surfaces, when counted from the light incidence side; and f : The focal length of the entire system.

On one hand, it is desirable to satisfy the following conditions:

$$0.8 < f_7/f_3 < 3 \tag{3}$$

$$2 < -f_1/f < 5 \tag{4}$$

$$0.5 < r_5/r_7 < 1 \tag{5}$$

$$0.5 < |r_5/r_{13}| < 2 \tag{6}$$

where $f_i$: the focal length of the i-th constituent lens, when counted from the light incidence side.

On the other hand, it is desirable to satisfy the following conditions:

$$20 < v_p - v_3 < 40 \tag{7}$$

$$20 < v_p - v_7 < 40 \tag{8}$$

$$0.05 < n_p - n_1 < 0.35 \tag{9}$$

$$0.01 < n_3 - n_p < 0.25 \tag{10}$$

$$0.01 < n_7 - n_p < 0.25 \tag{11}$$

where $v_p$: the mean value of the Abbe numbers of the aforesaid positive lenses;

$n_p$: the mean value of the refractive indices of the aforesaid positive lenses;

$v_i$: the Abbe number of the i-th lens, when counted from the light incidence side; and $n_i$: the refractive index for the spectral d-line of the i-th lens, when counted from the light incidence side.

Furthermore, it is desirable to employ an aspheric surface in the fourth lens surface from the light incidence side.

As the eyepiece lens employs such form and such construction and arrangement of the constituent lenses, the reason for this is first explained.

The reason why, at the most light incidence side, there is arranged the negative lens E1 (in the numerical examples, a negative meniscus lens convex toward the light incidence side, or a biconcave lens) is to increase the eye relief. The reason that the positive lens E2 is arranged at the second place from the light incidence side is to allow the overall focal length of the third lens and those that follow to increase so that the long eye relief can be obtained. The third and fourth lenses E3 and E4 from the light incidence side are cemented together to form a negative meniscus lens which reduces curvature of field.

The cemented surface of the most light exit side in the cemented positive meniscus lens corrects well lateral chromatic aberrations of higher order that the surface r4 produces.

The significances of the upper and lower limits of the above-described conditions (1) and (2), or (3) to (6), or (7) to (11) are described below.

The inequalities of condition (1) give a range for the ratio of the radii of curvature of the fourth and fifth lens surfaces from the light incidence side. Outside the range beyond the lower limit of the condition (1), as it means that the radius of curvature of the fourth lens surface from the light incidence side is relatively too small, astigmatism becomes over-corrected. Outside the range beyond the upper limit of the condition (1), as it means that the radius of curvature of the fifth lens surface from the light incidence side is relatively too small, lateral chromatic aberrations of higher order become large. So, these violations are objectionable.

The inequalities of condition (2) give a range for the ratio of the fourth separation from the light incidence side to the focal length of the entire system. Outside the range beyond the lower limit of the condition (2), distortion becomes under-corrected. Outside the range beyond the upper limit of the condition (2), the physical length of the lens becomes long. So, these violations are objectionable.

The inequalities of condition (3) give a range for the ratio of the focal length of the third lens from the light incidence side to the focal length of the seventh lens. Outside the range beyond the lower limit of the condition (3), as it means that the power of the seventh lens from the light incidence side is relatively too strong, the lens diameter becomes large. Outside the range beyond the upper limit of the condition (3), as it means that the power of the third lens from the light incidence side is relatively too strong, lateral chromatic aberrations of higher order become large. So, these violations are objectionable.

The inequalities of condition (4) give a range for the ratio of the focal length of the first lens from the light incidence side to the focal length of the entire system. Outside the range beyond the lower limit of the condition (4), spherical aberration becomes over-corrected. Outside the range beyond the upper limit of the condition (4), the eye relief becomes short. So, these violations are objectionable.

The inequalities of condition (5) give a range for the ratio of the radius of curvature of the fifth lens surface from the light incidence side to the radius of curvature of the seventh lens surface. Outside the range beyond the lower limit of condition (5), astigmatism becomes over-corrected. Outside the range beyond the upper limit of the condition (5), coma becomes over-corrected. So, these violations are objectionable.

The inequalities of condition (6) give a range for the ratio of the radius of curvature of the fifth lens surface from the light incidence side to the thirteenth lens surface from the light incidence side. Outside the range beyond the lower limit of the condition (6), lateral chromatic aberrations of higher order become large. Outside the range beyond the upper limit of the condition (6), distortion becomes under-corrected. So, these violations are objectionable.

The inequalities of condition (7) give a range for the difference between the mean value of the Abbe numbers of the positive lenses and the value of the Abbe number of the third lens from the light incidence side. Outside the range beyond the lower limit of the condition (7), longitudinal and lateral chromatic aberrations both become under-corrected. Outside the range beyond the upper limit of the condition (7), longitudinal and lateral chromatic aberrations both become over-corrected. So, these violations are objectionable.

The inequalities of condition (8) give a range for the difference between the mean value of the Abbe numbers of the positive lenses and the value of the Abbe number of the seventh lens from the light incidence side. Outside the range beyond the lower limit of the condition (8), longitudinal and lateral chromatic aberrations both become under-corrected. Outside the range beyond the upper limit of the condition (8), longitudinal and lateral chromatic aberrations both become over-corrected. So, these violations are objectionable.

The inequalities of condition (9) give a range for the difference between the mean value of the refractive indices of the positive lenses and the value of the refractive index of the first lens from the light incidence side. Outside the range beyond the lower limit of the condition (9), field curvature becomes under-corrected. Outside the range beyond the upper limit of the condition (9), field curvature becomes over-corrected. So, these violations are objectionable.

The inequalities of condition (10) give a range for the difference between the value of the refractive index of the third lens from the light incidence side and the mean value of the refractive indices of the positive lenses. When the upper limit of the condition (10) is exceeded, coma becomes large. When the upper limit of the condition (10) is exceeded, field curvature becomes under-corrected. So, these violations are objectionable.

The inequalities of condition (11) give a range for the difference between the value of the refractive index of the seventh lens from the light incidence side and the mean value of the refractive indices of the positive lenses. When the lower limit of the condition (11) is exceeded, coma becomes large. When the upper limit of the condition (11) is exceeded, field curvature becomes under-corrected.

Besides these, by using an aspheric surface in the fourth lens surface from the light incidence side, correction of distortion can be improved.

For the shape of the aspheric surface, the orientation always to the light exit side with respect to the paraxial sphere internally touching the lens vertex is suitable for correction of distortion.

The numerical examples 1 to 4 are shown below.

$r_i$: the radius of curvature of the i-th lens surface from the light incidence side;

$d_i$: the i-th axial separation between lens surfaces from the light incidence side;

$n_i$: the refractive index for the spectral d-line of the i-th lens from the light incidence side; and $v_i$: the Abbe number of the i-th lens from the light incidence side.

The shape of the aspheric surface is expressed by the following equation:

$$x = (y^2/r)/(1 + \sqrt{1 - (1+k)\cdot(y/r)^2}) + A4\cdot y^4 + A6\cdot y^6 + A8\cdot y^8$$

where r: the radius of the paraxial sphere; and
k: conical constant.

Numerical Example 1:

| | f = 16.70 | | | 2ω = 80° | |
|---|---|---|---|---|---|
| r 1 = | 48.964 | d 1 = | 2.00 | n 1 = 1.51742 | v 1 = 52.4 |
| r 2 = | 18.727 | d 2 = | 7.55 | | |
| r 3 = | −45.353 | d 3 = | 13.65 | n 2 = 1.71300 | v 2 = 53.8 |
| r 4 = | −20.641 | d 4 = | 3.85 | | |
| r 5 = | −19.165 | d 5 = | 2.50 | n 3 = 1.80518 | v 3 = 25.4 |
| r 6 = | 272.020 | d 6 = | 16.45 | n 4 = 1.71300 | v 4 = 53.8 |
| r 7 = | −26.859 | d 7 = | 0.20 | | |
| r 8 = | 267.389 | d 8 = | 6.20 | n 5 = 1.69680 | v 5 = 55.5 |
| r 9 = | −86.144 | d 9 = | 0.20 | | |
| r 10 = | 44.066 | d 10 = | 5.55 | n 6 = 1.69680 | v 6 = 55.5 |
| r 11 = | 126.573 | d 11 = | 0.20 | | |
| r 12 = | 34.141 | d 12 = | 2.00 | n 7 = 1.84666 | v 7 = 23.8 |
| r 13 = | 16.443 | d 13 = | 10.00 | n 8 = 1.77250 | v 8 = 49.6 |
| r 14 = | 52.555 | | | | |

Pupil Diameter: φ3.3; Eye Relief: 15 mm

Numerical Example 2:

| | f = 16.65 | | | 2ω = 80° | |
|---|---|---|---|---|---|
| r 1 = | 48.964 | d 1 = | 2.00 | n 1 = 1.51742 | v 1 = 52.4 |
| r 2 = | 19.039 | d 2 = | 8.59 | | |
| r 3 = | −30.652 | d 3 = | 10.00 | n 2 = 1.71300 | v 2 = 53.8 |
| r 4 = | −16.579 | d 4 = | 4.17 | | |
| r 5 = | −18.370 | d 5 = | 2.50 | n 3 = 1.80518 | v 3 = 25.4 |
| r 6 = | −153.616 | d 6 = | 14.10 | n 4 = 1.71300 | v 4 = 53.8 |
| r 7 = | −25.200 | d 7 = | 0.20 | | |
| r 8 = | −160.467 | d 8 = | 6.48 | n 5 = 1.69680 | v 5 = 55.5 |
| r 9 = | −45.838 | d 9 = | 0.20 | | |
| r 10 = | 33.813 | d 10 = | 5.31 | n 6 = 1.69680 | v 6 = 55.5 |
| r 11 = | 68.963 | d 11 = | 0.20 | | |
| r 12 = | 41.818 | d 12 = | 2.00 | n 7 = 1.84666 | v 7 = 23.8 |
| r 13 = | 16.443 | d 13 = | 9.26 | n 8 = 1.77250 | v 8 = 49.6 |
| r 14 = | 85.015 | | | | |

4th Surface: Aspherical K=5.57792×10$^{-2}$ A4=1.32841×10$^{31}$ [5] A6=−9.34663×10$^{-8}$ A8=1.10924×10$^{-9}$ Pupil Diameter: φ3.3; Eye Relief: 15 mm Numerical Example 3:

| | f = 16.59 | | | 2ω = 80° | |
|---|---|---|---|---|---|
| r 1 = | −30.984 | d 1 = | 2.00 | n 1 = 1.51742 | v 1 = 52.4 |
| r 2 = | 263.402 | d 2 = | 6.48 | | |
| r 3 = | −22.454 | d 3 = | 7.01 | n 2 = 1.71300 | v 2 = 53.8 |
| r 4 = | −12.895 | d 4 = | 10.32 | | |
| r 5 = | −21.572 | d 5 = | 2.50 | n 3 = 1.80518 | v 3 = 25.4 |
| r 6 = | 92.597 | d 6 = | 14.51 | n 4 = 1.71300 | v 4 = 53.8 |
| r 7 = | −27.008 | d 7 = | 0.20 | | |
| r 8 = | −160.678 | d 8 = | 4.68 | n 5 = 1.69680 | v 5 = 55.5 |
| r 9 = | −56.904 | d 9 = | 0.20 | | |
| r 10 = | 38.201 | d 10 = | 6.20 | n 6 = 1.69680 | v 6 = 55.5 |
| r 11 = | 156.520 | d 11 = | 0.20 | | |
| r 12 = | 31.680 | d 12 | 2.00 | n 7 = 1.84666 | v 7 = 23.8 |
| r 13 = | 16.443 | d 13 = | 8.71 | n 8 = 1.77250 | v 8 = 49.6 |
| r 14 = | 61.752 | | | | |

4th Surface: Aspherical K=−1.00056 A4=1.89859×10$^{-5}$ A6=−9.13619×10$^{-8}$ A8=9.22352×10$^{-12}$ Pupil Diameter: φ3.3; Eye Relief: 15 mm Numerical Example 4:

| f = 16.73 | | | | 2ω = 80° | |
|---|---|---|---|---|---|
| r 1 = | 52.986 | d 1 = | 2.00 | n 1 = 1.51742 | v 1 = 52.4 |
| r 2 = | 18.687 | d 2 = | 7.43 | | |
| r 3 = | −52.173 | d 3 = | 13.95 | n 2 = 1.71300 | v 2 = 53.8 |
| r 4 = | −21.322. | d 4 = | 4.30 | | |
| r 5 = | −19.265 | d 5 | 2.50 | n 3 = 1.84666 | v 3 = 23.8 |
| r 6 = | −539.065 | d 6 = | 14.32 | n 4 = 1.77250 | v 4 = 49.6 |
| r 7 = | −26.778 | d 7 = | 0.20 | | |
| r 8 = | 492.381 | d 8 = | 5.63 | n 5 = 1.77250 | v 5 = 49.6 |
| r 9 = | −85.561 | d 9 = | 0.20 | | |
| r 10 = | 47.133 | d 10 = | 5.04 | n 6 = 1.77250 | v 6 = 49.6 |
| r 11 = | 122.346 | d 11 = | 0.20 | | |
| r 12 = | 35.886 | d 12 = | 2.00 | n 7 = 1.84666 | v 7 = 23.8 |
| r 13 = | 16.520 | d 13 = | 10.10 | n 8 = 1.77250 | v 8 = 49.6 |
| r 14 = | 64.575 | | | | |

Pupil Diameter: φ3.3; Eye Relief: 15 mm
The values of the factors in the conditions:

| | ex. 1 | ex. 2 | ex. 3 | ex. 4 |
|---|---|---|---|---|
| (1) | 1.077 | 0.903 | 0.598 | 1.107 |
| (2) | 0.231 | 0.250 | 0.622 | 0.257 |
| (3) | 1.784 | 1.271 | 1.997 | 1.605 |
| (4) | 3.591 | 3.687 | 3.222 | 3.402 |
| (5) | 0.714 | 0.729 | 0.799 | 0.719 |
| (6) | 1.166 | 1.117 | 1.312 | 1.166 |
| (7) | 28.24 | 28.24 | 28.24 | 26.64 |
| (8) | 29.84 | 29.84 | 29.84 | 26.64 |
| (9) | 0.201 | 0.201 | 0.201 | 0.24318 |
| (10) | 0.08676 | 0.08676 | 0.08674 | 0.8606 |
| (11) | 0.12824 | 0.12824 | 0.12824 | 0.08606 |

By the foregoing embodiment, an eyepiece lens of wide visual field has been realized. However, because an middle image plane MIP is formed in the interior of a constituent lens, if the constituent lens has scratches or dust in or on the surface thereof, or minute bubbles in the medium thereof, there is some possibility of deteriorating the image quality.

Therefore, another embodiment to be described below is made to have a feature that the middle image plane is formed in an air space between two of the constituents.

An eyepiece lens according to the present embodiment comprises, in order from the light incidence side, a first lens unit of negative refractive power, a second lens unit of positive refractive power, followed after a middle image plane, by a third lens unit of positive refractive power, a fourth lens unit of positive refractive power and a fifth lens unit of positive refractive power having a strong power on the light incidence side, thereby making it possible to increase the apparent field angle to 75° or more, while still permitting the size to be minimized, good optical performance to be obtained, and the eye relief to be so long as 0.9 times the focal length.

In more detail, referring to FIG. 9 through FIG. 12, as viewed from the light incidence side, a bi-concave lens constitutes the first lens unit U1; a positive meniscus lens concave toward the light incidence side constitutes the second lens unit U2; after the middle image plane MIP, a positive meniscus lens concave toward the light incidence side formed by cementing a positive lens having a strong power on the light incidence side constitutes the third lens unit U3; two positive lenses constitute the fourth lens unit U4; and a negative meniscus lens convex toward the light incidence side and a positive lens having a strong power on the light incidence side are cemented together to form a positive lens having a strong power on the light incidence side, and constitute the fifth lens unit U5. Notice that FIG. 9 through FIG. 12 depict the lens forms of the numerical examples 5 to 8.

For such an eyepiece lens, it is desirable to satisfy the following conditions:

$$0.3 < R_{2ex}/R_{3in} < 1.4 \tag{12}$$

$$0.15 < dg_{23}/f < 1.3 \tag{13}$$

where $R_{2ex}$: the radius of curvature of the lens surface in the second lens unit nearest to the light exit side;

$R_{3in}$: the radius of curvature of the lens surface in the third lens unit nearest to the incidence side;

$dg_{23}$: the air separation between the second and third lens units; and f: the focal length of the entire system.

It is more desirable to satisfy the following additional conditions:

$$1 < -f_1/f < 5 \tag{14}$$

$$0.5 < R_{3in}/R_{3ex} < 1.4 \tag{15}$$

where $f_1$: the focal length of the first lens unit; and $R_{3ex}$: the radius of curvature of the lens surface in the third lens unit nearest to the light exit side.

Further, it is desirable to satisfy the following additional conditions:

$$0.8 < f_{5in}/f_{3in} < 3 \tag{16}$$

$$0.5 < R_{3in}/R_{5S} < 2.2 \tag{17}$$

$$15 < v_p - v_{3in} < 35 \tag{18}$$

$$15 < v_p - v_{5in} < 40 \tag{19}$$

$$0.05 < n_p - n_1 < 0.35 \tag{20}$$

$$-0.15 < n_{3in} - n_p < 0.25 \tag{21}$$

$$0.01 < n_{5in} - n_p < 0.25 \tag{22}$$

where $f_{5in}$: the focal length of the constituent lens on the light incidence side in the fifth lens unit;

$f_{3in}$: the focal length of the constituent lens on the light incidence side in the third lens unit;

$R_{5S}$: the radius of curvature of the cemented surface in the fifth lens unit;

$v_p$: the mean value of the Abbe numbers of the positive lenses;

$v_{3in}$: the Abbe number of the constituent lens on the light incidence side in the third lens unit;

$v_{5in}$: the Abbe number of the constituent lens on the light incidence side in the fifth lens unit;

$n_p$: the mean value of the refractive indices of the positive lenses;

$n_1$: the refractive index of the first lens unit;

$n_{3i}$: the refractive index of the constituent lens on the light incidence side in the third lens unit; and $n_{5i}$: the refractive index of the constituent lens on the light incidence side in the fifth lens unit.

Next, the functions of the above-described lens units are explained.

In the order from the light incidence side, it is in the space up to the middle image plane that the first lens unit of negative refractive power and the second lens unit of positive refractive power are arranged. The reason for this is that the off-axial light rays arrive on the middle image plane at increased heights to increase the eye relief and that, as the light exit side of the middle image plane produces astigmatism and coma, their opposite aberrations are produced to reduce the astigmatism and coma as a whole. With the lens units arranged on either side of the middle image plane, those rays of the off-axial light beam which lie above the principal ray on the light incidence side become the lower rays than the principal ray on the light exit side. Those rays of the off-axial light beam which lie below the principal ray on the light incidence side become the upper rays above the principal ray on the light exit side. Therefore, the aberrations produced on either side of the middle image plane are opposite to each other. Hence, aberration correction can be done well.

Further, from the middle image plane toward the light exit side, there is first arranged the third lens unit in the form of the positive lens concave toward the light incidence side. The reason for this is to increase the heights of the off-axial rays from the optical axis to obtain a long eye relief. Then, toward the light exit side, the fourth lens unit is arranged in the form of the two positive lenses, over which the power is distributed to lessen the produced coma and astigmatism. Next to it, the fifth lens unit is arranged in the form of the positive lens whose cemented surface is convex toward the light incidence side and has a strong power on the light incidence side. With this, the off-axial rays are made incident on the cemented surface at right angles, thereby making it possible to reduce the lateral chromatic aberrations of higher order.

The significance of each of the conditions is explained below.

The inequalities of condition (12) give a range for the ratio of the radius of curvature of the lens surface on the light exit side in the second lens unit to the radius of curvature of the lens surface on the light incidence side in the third lens unit. Outside the range beyond the lower limit of the condition (12), as it means that the radius of curvature of the lens surface on the light exit side in the second lens unit is relatively too small, astigmatism becomes over-corrected. Outside the range beyond the upper limit of the condition (12), as it means that the radius of curvature of the lens surface on the light incidence side in the third lens unit is relatively too small and therefore that the angles of incidence of the off-axial rays on this surface are too large, lateral chromatic aberrations of higher order come to increase. So, these violations are objectionable. It is to be noted that the upper limit, or the lower limit, or both limits of the condition (12) may be altered to narrow the range according to $0.4<R_{2ex}/R_{3in}<1$.

The inequalities of condition (13) give a range for the ratio of the air separation between the second and third lens units to the focal length of the entire system. Outside the range beyond the lower limit of the condition (13), as it means that either the second or the third lens unit is too close to the middle image plane, the foreign particles or scratches on or in the lens surface, or bubbles within the lens become often conspicuous. Outside the range beyond the upper limit of the condition (13), the physical length of the lens becomes large. So, these violations are objectionable. It is to be noted that the upper limit, or the lower limit, or both limits of the condition (13) may be altered to narrow the range according to $0.5<dg_{23}/f<1.2$.

The inequalities of condition (14) give a range for the ratio of the focal length of the first lens unit to the focal length of the entire system. Outside the range beyond the lower limit of the condition (14), spherical aberration becomes under-corrected. Outside the range beyond the upper limit of the condition (14), as it means that the power of the first lens unit is too weak, the eye relief becomes short. So, these violations are objectionable. It is to be noted that the upper limit, or the lower limit, or both limits of the condition (14) may be altered to narrow the range according to $1.5<-f_1/f<3$.

The inequalities of condition (15) give a range for the ratio of the radius of curvature of the lens surface in the third lens unit nearest to the light incidence side to the radius of curvature of the lens surface nearest to the light exit side. Outside the range beyond the lower limit of the condition (15), astigmatism becomes over-corrected. Outside the range beyond the upper limit of the condition (15), coma becomes over-corrected. So, these violations are objectionable. It is to be noted that the upper limit, or the lower limit or both limits of the condition (15) may be altered to narrow the range according to $0.65<R_{3in}/R_{3ex}<1.25$.

The inequalities of condition (16) give a range for the ratio of the focal length of the lens on the light incidence side in the fifth lens unit to the focal length of the lens on the light incidence side in the third lens unit. Outside the range beyond the lower limit of the condition (16), as it means that the power of the lens on the light incidence side in the fifth lens unit is relatively too strong, the lens diameter becomes large. Outside the range beyond the upper limit of the condition (16), as it means that the power of the lens on the light incidence side in the third lens unit is relatively too strong, lateral chromatic aberrations of higher order come to increase. So, these violations are objectionable.

The inequalities of condition (17) give a range for the ratio of the radius of curvature of the lens surface in the third lens unit nearest to the light incidence side to the radius of curvature of the cemented surface in the fifth lens unit. Outside the range beyond the lower limit of the condition (17), lateral chromatic aberrations of higher order become large. Outside the range beyond the upper limit of the condition (17), distortion becomes under-corrected. So, these violations are objectionable.

The inequalities of condition (18) give a range for the difference between the mean value of the Abbe numbers of the positive lenses and the value of the Abbe number of the lens on the light incidence side in the third lens unit. Outside the range beyond the lower limit of the condition (18), longitudinal chromatic aberration and lateral chromatic aberration become under-corrected. Outside the range beyond the upper limit of the condition (18), longitudinal chromatic aberration and lateral chromatic aberration become over-corrected. So, these violations are objectionable.

The inequalities of condition (19) give a range for the difference between the mean value of the Abbe numbers of the positive lenses and the value of the Abbe number of the lens on the light incidence side in the fifth lens unit. Outside the range beyond the lower limit of the condition (19), longitudinal chromatic aberration and lateral chromatic aberration become under-corrected. Outside the range beyond the upper limit of the condition (19), longitudinal chromatic aberration and lateral chromatic aberration become over-corrected. So, these violations are objectionable.

The inequalities of condition (20) give a range for the difference between the mean value of the refractive indices of the positive lenses and the value of the refractive index of the first lens unit. Outside the range beyond the lower limit of the condition (20), field curvature becomes under-corrected. Outside the range beyond the upper limit of the condition (20), field curvature becomes over-corrected. So, these violations are objectionable.

The inequalities of condition (21) give a range for the difference between the value of the Abbe number of the lens on the light incidence side in the third lens unit and the mean value of the refractive indices of the positive lenses. Outside the range beyond the lower limit of the condition (21), coma becomes large. Outside the range beyond the upper limit of the condition (21), field curvature becomes under-corrected. So, these violations are objectionable.

The inequalities of condition (22) give a range for the difference between the refractive index of the lens on the light incidence side in the fifth lens unit and the mean value of the refractive indices of the positive lenses. Outside the range beyond the lower limit of the condition (22), coma becomes large. Outside the range beyond the upper limit of the condition (22), field curvature becomes under-corrected. So, these violations are objectionable.

The numerical examples 5 to 8 are shown below.

$r_i$: the radius of curvature of the i-th lens surface from the light incidence side;

$d_i$: the i-th lens surface separation from the light incidence side;

$n_i$: the refractive index for the spectral d-line of the i-th lens from the light incidence side; and $v_i$: the Abbe number of the i-th lens from the light incidence side.

Numerical Example 5:

| | f = 16.59044 | | Pupil Diameter φ 3.3 | 2ω = 75° | |
|---|---|---|---|---|---|
| r 1 = | −34.252 | d 1 = | 1.50 | n 1 = 1.51742 | v 1 = 52.4 |
| r 2 = | 34.253 | d 2 = | 5.64 | | |
| r 3 = | −33.308 | d 3 = | 4.80 | n 2 = 1.83400 | v 2 = 37.2 |
| r 4 = | −19.471 | d 4 = | 12.00 | | |
| r 5 = | −25.715 | d 5 = | 3.00 | n 3 = 1.64769 | v 3 = 33.8 |
| r 6 = | 63.090 | d 6 = | 14.60 | n 4 = 1.60311 | v 4 = 60.7 |
| r 7 = | −29.621 | d 7 = | 0.20 | | |
| r 8 = | 142.339 | d 8 = | 7.90 | n 5 = 1.69680 | v 5 = 55.5 |
| r 9 = | −58.789 | d 9 = | 0.20 | | |
| r 10 = | 50.151 | d 10 = | 4.90 | n 6 = 1.69680 | v 6 = 55.5 |
| r 11 = | 194.274 | d 11 = | 0.20 | | |
| r 12 = | 36.479 | d 12 = | 2.00 | n 7 = 1.84666 | v 7 = 23.8 |
| r 13 = | 16.048 | d 13 = | 9.60 | n 8 = 1.69680 | v 8 = 55.5 |
| r 14 = | 84.783 | d 14 = | 15.00 | | |

Numerical Example 6:

| | f = 16.54527 | | Pupil Diameter φ 3.3 | 2ω = 75° | |
|---|---|---|---|---|---|
| r 1 = | −30.399 | d 1 = | 1.50 | n 1 = 1.51742 | v 1 = 52.4 |
| r 2 = | 34.688 | d 2 = | 5.43 | | |
| r 3 = | −38.834 | d 3 = | 5.08 | n 2 = 1.83400 | v 2 = 37.2 |
| r 4 = | −19.791 | d 4 = | 12.00 | | |
| r 5 = | −25.502 | d 5 = | 3.00 | n 3 = 1.64769 | v 3 = 33.8 |
| r 6 = | 52.604 | d 6 = | 15.40 | n 4 = 1.60311 | v 4 = 60.7 |
| r 7 = | −29.556 | d 7 = | 0.20 | | |
| r 8 = | 123.403 | d 8 = | 7.47 | n 5 = 1.69680 | v 5 = 55.5 |
| r 9 = | −66.402 | d 9 = | 0.20 | | |
| r 10 = | 46.658 | d 10 = | 5.06 | n 6 = 1.69680 | v 6 = 55.5 |
| r 11 = | 176.987 | d 11 = | 0.20 | | |
| r 12 = | 37.007 | d 12 = | 2.00 | n 7 = 1.84666 | v 7 = 23.8 |
| r 13 = | 16.257 | d 13 = | 8.98 | n 8 = 1.69680 | v 8 = 55.5 |
| r 14 = | 82.866 | d 14 = | 15.00 | | |

Numerical Example 7:

| | f = 14.99012 | | Pupil Diameter φ 3 | 2ω = 75° | |
|---|---|---|---|---|---|
| r 1 = | −31.534 | d 1 = | 1.50 | n 1 = 1.51742 | v 1 = 52.4 |
| r 2 = | 31.535 | d 2 = | 5.36 | | |
| r 3 = | −26.321 | d 3 = | 4.37 | n 2 = 1.83400 | v 2 = 37.2 |
| r 4 = | −17.957 | d 4 = | 12.00 | | |
| r 5 = | −25.662 | d 5 = | 3.00 | n 3 = 1.64769 | v 3 = 33.8 |
| r 6 = | 49.479 | d 6 = | 14.49 | n 4 = 1.60311 | v 4 = 60.7 |
| r 7 = | −28.845 | d 7 = | 0.20 | | |
| r 8 = | −6400.841 | d 8 = | 6.11 | n 5 = 1.69680 | v 5 = 55.5 |
| r 9 = | −56.913 | d 9 = | 0.20 | | |
| r 10 = | 42.537 | d 10 = | 7.27 | n 6 = 1.69680 | v 6 = 55.5 |
| r 11 = | −950.029 | d 11 = | 0.20 | | |
| r 12 = | 38.832 | d 12 = | 2.00 | n 7 = 1.84666 | v 7 = 23.8 |
| r 13 = | 16.000 | d 13 = | 10.29 | n 8 = 1.69680 | v 8 = 55.5 |
| r 14 = | 101.687 | d 14 = | 15.00 | | |

Numerical Example 8:

| | f = 12.11245 | | φ 2.4 | 2ω = 75° | |
|---|---|---|---|---|---|
| r 1 = | −19.099 | d 1 = | 1.50 | n 1 = 1.51742 | v 1 = 52.4 |
| r 2 = | 45.160 | d 2 = | 4.24 | | |
| r 3 = | −18.412 | d 3 = | 3.37 | n 2 = 1.83400 | v 2 = 37.2 |
| r 4 = | −14.531 | d 4 = | 12.00 | | |
| r 5 = | −26.489 | d 5 = | 3.00 | n 3 = 1.72825 | v 3 = 28.5 |
| r 6 = | 30.562 | d 6 = | 15.21 | n 4 = 1.60311 | v 4 = 60.7 |
| r 7 = | −24.888 | d 7 = | 0.20 | | |
| r 8 = | 966.762 | d 8 = | 5.53 | n 5 = 1.69680 | v 5 = 55.5 |
| r 9 = | −56.744 | d 9 = | 0.20 | | |
| r 10 = | 32.044 | d 10 = | 6.40 | n 6 = 1.77250 | v 6 = 49.6 |
| r 11 = | 139.606 | d 11 = | 0.20 | | |
| r 12 = | 49.437 | d 12 = | 2.00 | n 7 = 1.80518 | v 7 = 25.4 |
| r 13 = | 16.000 | d 13 = | 10.71 | n 8 = 1.69680 | v 8 = 55.5 |
| r 14 = | 1405.351 | d 14 = | 15.00 | | |

The values of the factors in the conditions:

| | ex. 5 | ex. 6 | ex. 7 | ex. 8 |
|---|---|---|---|---|
| (12) | 0.757 | 0.776 | 0.700 | 0.549 |
| (13) | 0.723 | 0.725 | 0.801 | 0.991 |
| (14) | 1.980 | 1.878 | 2.017 | 2.124 |
| (15) | 0.868 | 0.863 | 0.890 | 1.064 |
| (16) | 1.273 | 1.371 | 1.304 | 1.583 |
| (17) | 1.602 | 1.569 | 1.604 | 1.656 |
| (18) | 19.092 | 19.092 | 19.092 | 23.2 |
| (19) | 29.112 | 29.112 | 29.112 | 26.3 |
| (20) | 0.1881 | 0.1881 | 0.1881 | 0.2032 |
| (21) | −0.05781 | −0.05781 | −0.05781 | 0.00763 |
| (22) | 0.14116 | 0.14116 | 0.14116 | 0.08456 |

The next embodiment is to satisfy a visual field angle of about 60 degrees by a small number of constituent lenses.

An eyepiece lens according to the invention has, in the order from the light incidence side, a positive first lens E1 of meniscus form convex toward the light exit side, a negative second lens E2 of bi-concave form having a strong negative refracting surface on the light incidence side, a positive third lens E3 of bi-convex form having a strong positive refracting surface on the light exit side, a positive fourth lens E4, a negative fifth lens E5 of meniscus form convex toward the light incidence side and a positive sixth lens of meniscus form convex toward the light incidence side, wherein the fifth lens E5 and the sixth lens E6 are cemented together, and wherein letting the radius of curvature of the i-th lens surface, when counted from the light incidence side, be denoted by $r_i$, the i-th lens thickness or air separation by $d_i$, and the focal length of the entire system by f, the following conditions are satisfied:

$$0.9 < r_2/r_3 < 1.8 \quad (23)$$

$$0.15 < d_1/f < 0.3 \tag{24}$$

Another eyepiece lens has, in the order from the light incidence side, a positive first lens E1 of meniscus form convex toward the light exit side, a negative second lens E2 of bi-concave form having a strong negative refracting surface on the light incidence side, a positive third lens E3 of bi-convex form having a strong positive refracting surface on the light exit side, a positive fourth lens E4, a negative fifth lens E5 of meniscus form convex toward the light exit side and a positive sixth lens E6 of meniscus form convex toward the light incidence side, wherein the lens surface on the light exit side in the aforesaid first lens E1 is formed to an aspheric shape such that the positive refractive power becomes progressively weaker from the lens center to the lens margin.

Figure 17:
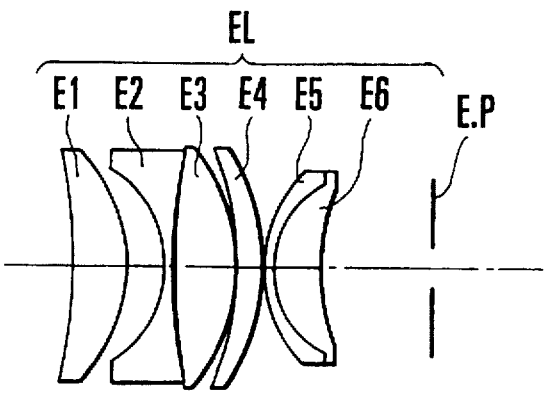
FIG. 17 is a lens block diagram of a numerical example 9.
Figure 18:
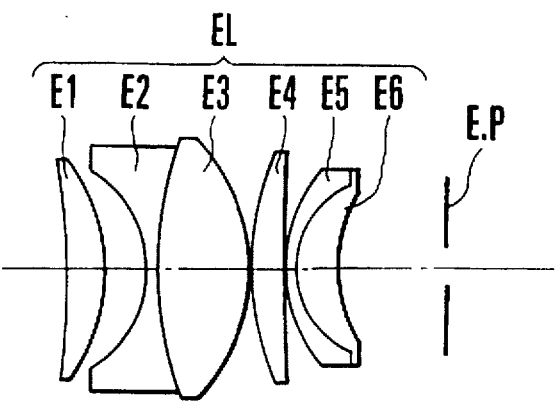
FIG. 18 is a lens block diagram of a numerical example 10.
Figure 19:
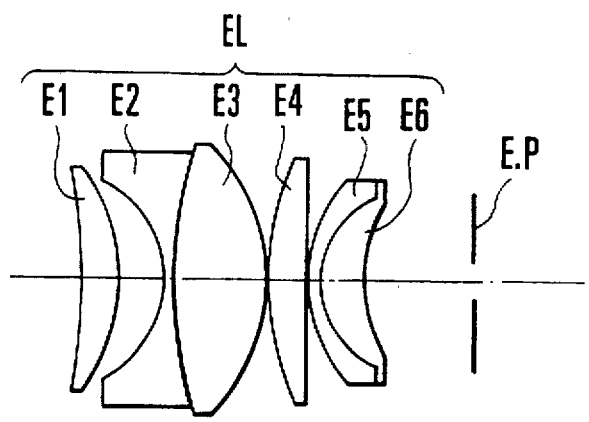
FIG. 19 is a lens block diagram of a numerical example 11.
Figure 20A:
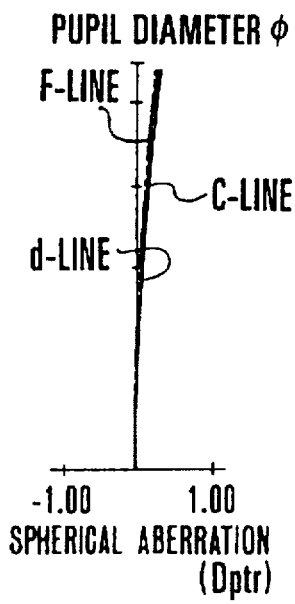
FIGS. 20A–20D show the various aberrations of the numerical example 9.
Figure 20B:
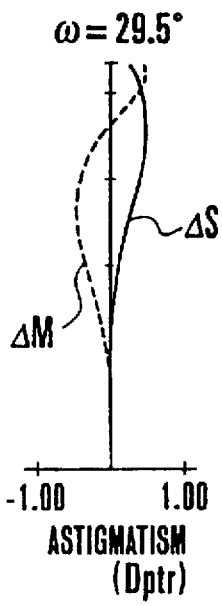
Figure 20C:
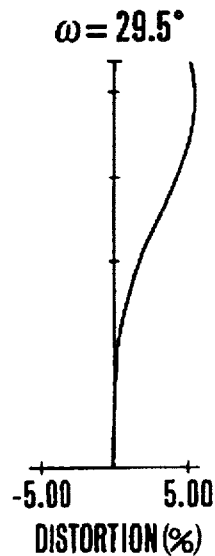
Figure 20D:
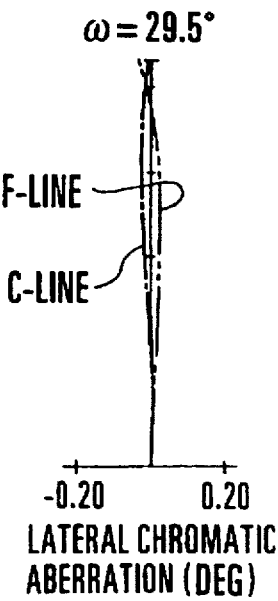
Figure 21A:
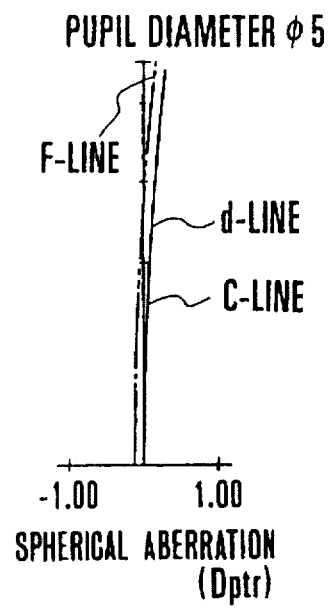
FIGS. 21A–21D show the various aberrations of the numerical example 10.
Figure 21B:
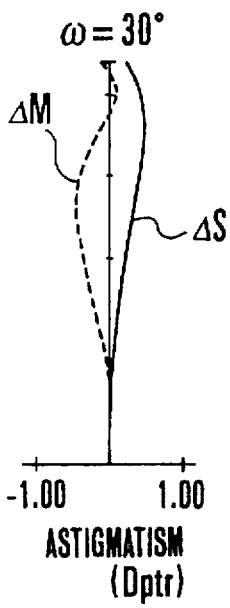
Figure 21C:
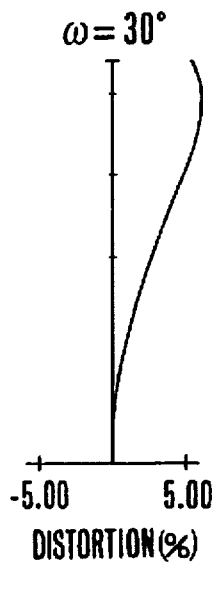
Figure 21D:
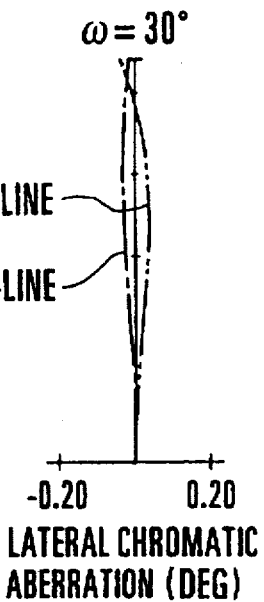

FIGS. 17 to 19 are longitudinal section views of numerical examples 9 to 11 of eyepiece lenses of the invention. FIGS. 20A–20D to 22A–22D are graphs of the aberrations of the numerical examples 9 to 11.

In the drawings, reference character EL denotes the eyepiece lens, and reference character E.P indicates the position of the observer's eye (pupil).

The eyepiece lenses of the numerical examples 9 to 11 are obtained by improving the Erfle type eyepiece lens and have a feature that the entrance pupil is positioned at a predetermined point on the light incidence side of the eyepiece lens EL, while still permitting various aberrations including distortion to be corrected well.

The most common eyepiece lens of Erfle type is constructed with three components with five elements, as comprising, in the order from the light incidence side, a negative lens concave toward the light incidence side, a positive lens convex toward the light exit side, these lenses being cemented together to form a meniscus lens, a positive lens, a positive lens convex toward the light incidence side and a negative lens concave toward the light exit side, the last two lenses being cemented together to form a meniscus lens.

The Erfle type of eyepiece lens has such construction and arrangement of the constituent lenses which is suitable for widening the apparent angular field and is well corrected for coma, field curvature and lateral chromatic aberration.

In such an eyepiece lens of the Erfle type, however, the off-axial principal ray that comes from the marginal zone of the angular field and goes to the pupil is strongly refracted to the margin of the lens by the lens surface nearest to the light incidence side. As it then travels through the lens surfaces, the off-axial principal ray is gradually refracted toward the optical axis, reaching the eye pupil. Owing to such a lens structure, pincushion type distortion is particularly liable to increase largely.

From this reason, in the eyepiece lens of the present embodiment, for this Erfle type eyepiece lens to improve, it is at the most light incidence side that the positive first lens El of meniscus form convex toward the light exit side is inserted.

By this, mainly barrel type distortion is produced to a large amount from the lens surface of the light exit side in that positive first lens El, thus achieving good correction of distortion. Another advantage arising from the insertion of the first lens E1 is that the overall focal length of the lenses that follow is increased to increase the eye relief.

The second lens E2 is made to be a negative lens of bi-concave form with its refracting surface of the light incidence side being stronger negative than that of the light exit side, so that the optical system of from the second lens E2 to the sixth lens E6 gets a principal point of the light exit side moved to the light exit side. Thus, the eye relief is increased. The fifth lens E5 is made to be a negative lens of meniscus form convex toward the light incidence side, thereby reducing the share of the negative refractive power on the second lens E2. Thus, lateral chromatic aberration is lessened.

The convex lens surface on the light exit side in the first lens E1 is formed to an aspheric shape such that the positive refractive power becomes progressively weaker from the lens center to the lens margin. Thus, distortion is mainly corrected well when the field angle is much increased.

Particularly for the shape of the aspheric surface, it is preferred from the standpoint of the correction of distortion that the aspheric surface orients toward the light exit side from the paraxial sphere internally touching the lens vertex. Since the fifth lens E5 and the sixth lens E6 have high sensitivities, it is preferred from the standpoint of the aberration correction and the manufacturing that these two lenses are cemented together.

The technical significances of the above-described conditions are explained below.

The inequalities of condition (23) give a range for the ratio of the radius of curvature of the lens surface on the light exit side in the lens of the most light incidence side or the first lens E1 of meniscus form to the radius of curvature of the lens surface adjacent thereto, or the lens surface of the light incidence side in the second lens E2. These two lens surfaces have strong curvatures for the purpose of correcting distortion, but produce astigmatisms and field curvatures which cancel each other. Thus, these aberrations are well corrected.

When the lower limit of the condition (23) is exceeded, as this implies that the radius of curvature of the lens surface on the light exit side in the first lens E1 is too small, field curvature and astigmatism become large objectionably. When the upper limit is exceeded, as this implies that the radius of curvature of the lens surface on the light exit side in the first lens unit E1 is too large, distortion becomes difficult to correct. As this implies also that the radius of curvature of the lens surface on the light incidence side in the second lens E2 is relatively too small, coma becomes difficult to correct.

The inequalities of condition (24) give a range for the ratio of the air separation between the first lens E1 and the second lens E2 to the focal length of the entire system.

Outside the range beyond the lower limit of the condition (24), distortion becomes under-corrected objectionably. Outside the range beyond the upper limit of the condition (24), correction of distortion can be done well, but the eye relief becomes short objectionably.

In connection with the present embodiment, it should be pointed out that within the ranges of the conditions (23) and (24), the height ha of incidence of the off-axial principal ray on the lens surface on the light exit side in the first lens E1 is made higher than that on the next lens surface, or that on the light incidence side in the second lens E2, to thereby well correct distortion.

The eyepiece lens that the invention aims at can be achieved by satisfying the conditions described above. To further improve the correction of the various aberrations resulting from the increase of the field angle to obtain a high optical performance, it is recommended to satisfy at least one of the following conditions:

Letting the focal length of the i-th lens be denoted by $f_i$, $$1.5 < f_5/f_2 < 5 \tag{25}$$

is satisfied.

The inequalities of condition (25) give a range for the ratio of the focal length of the fifth lens E5 to the focal length of the second lens E2. Outside the range beyond the lower limit of the condition (25), as it means that the power of the second lens E2 is relatively too weak, the eye relief becomes short objectionably.

Outside the range beyond the upper limit of the condition (25), as it means that the power of the second lens E2 is relatively too strong, lateral chromatic aberrations of higher order becomes large objectionably.

Letting the refractive index and Abbe number of the material of the i-th lens be denoted by $n_i$ and $v_i$, respectively, and the mean value of the refractive indices and the Abbe numbers of the materials of the positive lenses by $n_p$ and $v_p$, respectively, $$0.05 < n_p - n_2 < 0.16 \quad (26)$$

$$10 < v_p v_2 < 25 \quad (27)$$

are satisfied.

The conditions (26) and (27) are concerned with the optical characteristics of the second lens E2.

Outside the range beyond the lower limit of the condition (26), field curvature becomes under-corrected. Outside the range beyond the upper limit of the condition (26), as it means that the refractive index of the material of the second lens E2 is relatively too small and, as a result, the radius of curvature of the lens surface on the light incidence side in the second lens E2 is too small, coma becomes difficult to correct.

Outside the range beyond the lower limit of the condition (27), longitudinal chromatic aberration and lateral chromatic aberration become under-corrected. Outside the range beyond the upper limit, longitudinal chromatic aberration and lateral chromatic aberration become over-corrected. So, these violations are objectionable.

Letting the refractive index and the Abbe number of the material of the i-th lens be denoted by $n_i$ and $v_i$, respectively and the mean values of the refractive indices and the Abbe numbers of the materials of the positive lenses by $n_p$ and $v_p$, respectively, $$0.05 < n_5 - n_p < 0.18 \quad (28)$$

$$20 < v_p - v_5 < 35 \quad (29)$$

are satisfied.

The conditions (28) and (29) are concerned with the optical characteristics of the meniscus-shaped fifth lens E5.

Outside the range beyond the lower limit of the condition (28), spherical aberration becomes under-corrected. Outside the range beyond the upper limit, field curvature becomes under-corrected. So, these violations are objectionable.

Outside the range beyond the lower limit of the condition (29), longitudinal chromatic aberration and lateral chromatic aberration become under-corrected. Outside the range beyond the upper limit, longitudinal chromatic aberration and lateral chromatic aberration become over-corrected. So, these violations are objectionable.

Next, numerical examples 9 to 11 of the invention are shown. In the numerical data for the examples 9 to 11, ri is the radius of curvature of the i-th lens surface from the light incidence side, di is the i-th lens thickness or air separation from the light incidence side, and ni and i are respectively the refractive index and the Abbe number of the glass of the i-th lens from the light incidence side.

The values of the factors in the above-described conditions for the numerical examples 9 to 11 are listed later.

The shape of the aspheric surface is expressed in the coordinates with an X axis in the axial direction and an H axis in the direction perpendicular to the optical axis, the direction in which light advances being taken as positive, by the following equation:

$$X = (1/R)H^2/(1+\sqrt{1-(1+K)(H/R)^2}) + B_2H^4 + B_3H^6 + B_4H^8$$

where R is the radius of the osculating sphere, and K, $B_2$, $B_3$ and $B_4$ are the aspheric coefficients.

Numerical Example 9:

| | f = 2.49 | | | | 2ω = 59° | |
|---|---|---|---|---|---|---|
| r 1 = | −72.12 | d 1 = | 7.30 | n 1 = 1.69680 | v 1 = | 55.5 |
| r 2 = | −20.45 | d 2 = | 5.00 | | | |
| r 3 = | −16.11 | d 3 = | 1.75 | n 2 = 1.64769 | v 2 = | 33.8 |
| r 4 = | 76.63 | d 4 = | 0.55 | | | |
| r 5 = | 114.41 | d 5 = | 9.20 | n 3 = 1.71300 | v 3 = | 53.8 |
| r 6 = | −23.54 | d 6 = | 0.20 | | | |
| r 7 = | −35.49 | d 7 = | 3.15 | n 4 = 1.77250 | v 4 = | 49.6 |
| r 8 = | −27.56 | d 8 = | 0.20 | | | |
| r 9 = | 19.11 | d 9 = | 1.35 | n 5 = 1.84666 | v 5 = | 23.8 |
| r 10 = | 13.49 | d 10 = | 6.35 | n 6 = 1.69680 | v 6 = | 55.5 |
| r 11 = | 28.96 | | | | | |

Pupil Diameter: 5; Eye Relief: 15
  r2: Aspherical $K = -6.976$ $B_2 = -7.3 \times 10^{-5}$ $B_3 = -2.3 \times 10^{-7}$ $B_4 = -4.01 \times 10^{-10}$ Numerical Example 10:

| | f = 25.0 | | | | 2ω = 60° | |
|---|---|---|---|---|---|---|
| r 1 = | −106.25 | d 1 = | 5.15 | n 1 = 1.83400 | v 1 = | 37.2 |
| r 2 = | −27.10 | d 2 = | 5.45 | | | |
| r 3 = | −16.50 | d 3 = | 2.00 | n2 = 4.64769 | v 2 = | 33.8 |
| r 4 = | 52.79 | d 4 = | 0.26 | | | |
| r 5 = | 57.30 | d 5 = | 12.98 | n3 = 1.71300 | v 3 = | 53.8 |
| r 6 = | −24.89 | d 6 = | 0.20 | | | |
| r 7 = | 42.27 | d 7 = | 4.30 | n 4 = 1.77250 | v 4 = | 49.6 |
| r 8 = | 215.74 | d 8 = | 0.20 | | | |
| r 9 = | 20.76 | d 9 = | 1.50 | n 5 = 1.84666 | v 5 = | 23.8 |
| r 10 = | 12.50 | d 10 = | 6.12 | n 6 = 1.72000 | v 6 = | 50.3 |
| r 11 = | 22.13 | | | | | |

Pupil Diameter: 5; Eye Relief: 15
Numerical Example 11:

| | f = 25.0 | | | | 2ω = 60° | |
|---|---|---|---|---|---|---|
| r 1 = | −82.06 | d 1 = | 5.12 | n 1 = 1.83400 | v 1 = | 37.2 |
| r 2 = | −26.45 | d 2 = | 5.50 | | | |
| r 3 = | −16.50 | d 3 = | 1.96 | n 2 = 1.64769 | v 2 = | 33.8 |
| r 4 = | 58.72 | d 4 = | 0.26 | | | |
| r 5 = | 63.89 | d 5 = | 13.03 | n 3 = 1.71300 | v 3 | 53.8 |
| r 6 = | −25.29 | d 6 = | 0.20 | | | |
| r 7 = | 42.71 | d 7 = | 5.20 | n 4   1.71300 | v 4 = | 53.8 |
| r 8 = | −7716.54 | d 8 = | 0.20 | | | |
| r 9 = | 21.10 | d 9 = | 1.50 | n 5 = 1.84666 | v 5 = | 23.8 |
| r 10 = | 12.50 | d 10 = | 6.64 | n 6 = 1.72000 | v 6 = | 50.3 |
| r 11 = | 21.23 | | | | | |

Pupil Diameter: 5; Eye Relief: 15
The computed values of the factors in the conditions:

|  | ex. 9 | ex. 10 | ex. 11 |
|---|---|---|---|
| (23) $r_2/r_3$ | 1.27 | 1.64 | 1.60 |
| (24) $d_4/f$ | 0.20 | 0.22 | 0.22 |
| (25) $f_7/f_2$ | 2.99 | 2.11 | 2.00 |
| (26) $f_9/f_2$ | 0.072 | 0.112 | 0.097 |
| (27) $v_p-v_2$ | 19.8 | 13.9 | 15.0 |
| (28) $n_5-n_p$ | 0.127 | 0.087 | 0.102 |
| (29) $v_p-v_5$ | 29.8 | 23.9 | 25 |

By setting forth the above-described rules of design, it is made possible to achieve an eyepiece lens of so wide an apparent field angle as about 60 or 80 degrees, which is nonetheless well corrected for distortion, curvature of field, lateral color and other aberrations over the entire area of the angular field to obtain an image of high quality to be observed.

What is claimed is:

1. An eyepiece lens comprising, in order from a light incidence side, a negative lens, a positive meniscus lens concave toward the light incidence side, a cemented negative meniscus lens concave toward the light incidence side formed by cementing a negative lens having a strong power on the light incidence side together with a positive lens having a strong power on a light exit side, a positive lens, a positive lens having a strong power on the light incidence side, and a cemented positive meniscus lens convex toward the light incidence side formed by cementing a negative meniscus lens convex toward the light incidence side together with a positive meniscus lens convex toward the light incidence side.

2. An eyepiece lens according to claim 1, satisfying the following conditions:

$$0.3 < r_4/r_5 < 1.5$$

$$0.15 < d_4/f < 0.9$$

where $r_i$: the radius of curvature of the i-th lens surface from the light incidence side;

$d_i$: the i-th surface separation from the light incidence side; and f: the focal length of the entire system.

3. An eyepiece lens according to claim 1, satisfying the following conditions:

$$0.8 < f_7/f_3 < 3$$

$$2 < -f_1/f < 5$$

$$0.5 < r_5/r_7 < 1$$

$$0.5 < |r_5/r_{13}| < 2$$

4. An eyepiece lens according to claim 1, 2 or 3, satisfying the following conditions:

$$20 < v_p-v_3 < 40$$

$$20 < v_p-v_7 21\ 40$$

$$0.05 < n_p-n_1 < 0.35$$

$$0.01 < n_3-n_p < 0.25$$

$$0.01 < n_7-n_p < 0.25$$

where $v_p$: the mean value of the Abbe numbers of said positive lenses;

$n_p$: the mean value of the refractive indices of said positive lenses;

$v_i$: the Abbe number of the i-th lens from the light incidence side; and $n_i$: the refractive index for the spectral d-line of the i-th lens from the light incidence side.

5. An eyepiece lens according to claim 1, 2 or 3, wherein the fourth lens surface, when counted from the light incidence side, is aspherical.

6. An eyepiece lens comprising, in order from a light incidence side, a bi-concave lens, a positive meniscus lens concave toward the light incidence side, a middle image plane, a positive meniscus lens concave toward the light incidence side formed by cementing a negative lens having a strong power on the light incidence side together with a positive lens having a strong power on the light exit side, two positive lenses, and a positive lens having a strong power on the light incidence side and formed by cementing a negative meniscus lens convex toward the light incidence side together with a positive lens having a strong power on the light incidence side.

7. An eyepiece lens comprising, in order from a light incidence side, a positive first lens of meniscus form convex toward a light exit side, a negative second lens of bi-concave form having a strong negative refracting surface on the light incidence side, a positive third lens of bi-convex form having a strong positive refracting surface on the light exit side, a positive fourth lens, a negative fifth lens of meniscus form convex toward the light incidence side, and a positive sixth lens of meniscus form convex toward the light incidence side, wherein said fifth lens and said sixth lens are cemented together, and wherein letting the radius of curvature of the i-th lens surface from the light incidence side be denoted by $r_i$, the i-th lens thickness or air separation by $d_i$, and the focal length of the entire system by f, $$0.9 < r_2/r_3 < 1.8$$

$$0.15 < d_2/f < 0.3$$

are satisfied.

8. An eyepiece lens comprising, in order from a light incidence side, a positive first lens of meniscus form convex toward a light exit side, a negative second lens of bi-concave form having a strong negative refracting surface on the light incidence side, a positive third lens of bi-convex form having a strong refracting surface on the light exit side, a positive forth lens, a negative fifth lens of meniscus form convex toward the light incidence side, and a positive sixth lens of meniscus form convex toward a light incidence side, wherein a lens surface on the light exit side in said first lens is formed to an aspheric shape such that the positive refractive power gets progressively weaker from the lens center to the lens margin.

9. An eyepiece lens according to claim 7 or 8, where letting the focal length of the i-th lens be denoted by $f_i$, $$1.5 < f_9/f_2 < 5$$

is satisfied.

10. An eyepiece lens according to claim 7, wherein letting the refractive index and the Abbe number of a material of the i-th lens be denoted by $n_i$ and $v_i$, respectively, and the mean values of refractive indices and the Abbe numbers of materials of said positive lenses by $n_p$ and $v_p$, respectively, $$0.05 < n_p - n_2 < 0.16$$

$$10 < v_p v_2 < 25$$

are satisfied.

11. An eyepiece lens according to claim 7 or 8, wherein letting the refractive index and the Abbe number of a material of the i-th lens be denoted by $n_i$ and $v_i$, respectively, and the mean values of refractive indices and the Abbe numbers of materials of said positive lenses by $n_p$ and $v_p$, respectively, $$0.05 < n_5 - n_p < 0.18$$

$$20 < v_p v_5 < 35$$

are satisfied.

12. An eyepiece lens according to claim 7 or 10, wherein a lens surface on the light exit side in said first lens unit is formed to an aspheric shape such that the positive refractive power gets progressively weaker from the lens center to the lens margin.

13. An eyepiece lens according to claim 8, wherein said fifth lens and said sixth lens are cemented together.

* * * * *

UNITED STATES PATENT AND TRADEMARK OFFICE
CERTIFICATE OF CORRECTION

PATENT NO. : 5,757,553
DATED : May 26, 1998
INVENTOR(S) : SABURO SUGAWARA

It is certified that error appears in the above-identified patent and that said Letters Patent is hereby corrected as shown below:

COLUMN 5:

Line 40, "upper" should read --lower--.

COLUMN 6:

Line 45, "$10^{31\ 5}$ should read --$10^{-5}$--.

COLUMN 7:

Line 34, "an" should read --a--.

COLUMN 13:

Line 52, "From" should read --For--.

COLUMN 15:

Line 10, "becomes" should read --become--;
Line 18, "$10<\nu_p\nu_2<25$" should read --$10<\nu_p-\nu_2<25$--; and

UNITED STATES PATENT AND TRADEMARK OFFICE
CERTIFICATE OF CORRECTION

PATENT NO. : 5,757,553

DATED : May 26, 1998

INVENTOR(S) : SABURO SUGAWARA

Page 2 of 3

It is certified that error appears in the above-identified patent and that said Letters Patent is hereby corrected as shown below:

COLUMN 16:

Line 31, "$B_2=7.3\times10^5$" should read --$B_2=-7.3\times10^5$--;
Line 33, "$B_3=2.3\times10^{-7}$" should read --$B_3=2.3\times10^{-7}$--; and
Line 35, "$B_4=4.01\times10^{31\ 10}$" should read --$B_4=-4.01\times10^{10}$--.

COLUMN 17:

Line 8, "(26) $f_5/f_2$" should read --(26) $n_p-n_2$--;
Line 61, "$20<\nu_p\nu_7 21\ 40$" should read --$20<\nu_p-\nu_7<40$--; and
Line 67, "$0.01<n_7 n_p<0.25$" should read --$0.01<n_7-n_p<0.25$--.

COLUMN 19:

Line 3, "$10<\nu_p\nu_2<25$" should read --$10<\nu_p-\nu_2<25$--.

UNITED STATES PATENT AND TRADEMARK OFFICE
CERTIFICATE OF CORRECTION

PATENT NO. : 5,757,553
DATED : May 26, 1998
INVENTOR(S) : SABURO SUGAWARA

It is certified that error appears in the above-identified patent and that said Letters Patent is hereby corrected as shown below:

COLUMN 20:

Line 2, "$20<\nu_p\nu_s<35$" should read --$20<\nu_p-\nu_s<35$--.

Signed and Sealed this

Eighteenth Day of May, 1999

Q. TODD DICKINSON

*Attest:*

*Attesting Officer*     Acting Commissioner of Patents and Trademarks